March 21, 1961   A. C. SCINTA   2,975,457
WINDSHIELD WIPER ARM
Filed April 28, 1958

INVENTOR.
ANTHONY C. SCINTA
BY
Bean Brooks Buckley & Bean.
ATTORNEYS

United States Patent Office 2,975,457
Patented Mar. 21, 1961

2,975,457

WINDSHIELD WIPER ARM

Anthony C. Scinta, Hamburg, N.Y., assignor to Trico Products Corporation, Buffalo, N.Y.

Filed Apr. 28, 1958, Ser. No. 731,330

16 Claims. (Cl. 15—250.21)

This invention relates to the windshield wiper art and particularly to windshield wipers for curved windshields.

The modern "wrap-around" windshields, almost universally installed on present-day automobiles, persent serious problems in obtaining effective cleaning of the windshields. These windshields ordinarily have a relatively flat surface portion of slight curvature, immediately before the driver and passenger, and flanking side portions to which they are joined by crest portions of more pronounced curvature. An effective wiper not only must clean the flat surface portion, but must sweep around the rather sharp corner or crest to clean the side portion. The requirement that the windshield wiper follow the curved surface necessitates wiper assemblies incorporating resilient elements for applying wiping pressure. These elements may be positioned between the oscillating drive shaft and the wiper arm, or within the wiper arm itself. This arrangement does provide accurate tracking under average driving conditions, the windshield wiper arm flexing to permit the wiper blade to follow the windshield curvature. However, under high speed driving conditions, this type of windshield wiper suffers from a deficiency in that the wind tends to lift the wiper blade from the surface of the windshield. This phenomenon has been observed to be particularly severe in that portion of the wiping stroke in which the wiper blade moves along the outer side edges of the "wraparound" windshield toward the center portion; i.e., the return stroke. As the wiper blade returns upwardly over the lateral curved area, strong wind currents will often lift the wiper from the windshield and let it slap back against the glass. It is obvious that cleaning action disappears entirely while the wiper blade is out of contact with the windshield.

Even if the wiper blade remains in contact with the windshield, the lifting force of the wind in this portion of the wiper stroke will appreciably decrease the pressure of the blade against the windshield, and thus decrease the effectiveness of the blade cleaning action.

The lifting action of the wind described above occurs in the manner indicated as the result of several coacting factors. Among these are the accentuation of the windstream by the curvature of the windshield, especially in the areas of greatest curvature, the resiliency of the wiper arm (or the resilient connection between the wiper arm and the oscillating drive shaft), the resiliency of the wiper blade, and the movement of the wiper arm against the windstream. The accentuated windstream strikes the wiper arm and resilient wiper blade as the arm and blade are driven against windstream. The opposing forces are resolved into a single force which acts to flex the wiper arm outwardly away from the windshield against the resistance of the resilient element tending to bias the wiper arm toward the windshield.

The present invention contemplates novel means in a windshield wiper assembly to defeat the tendency of the wind to lift the wiper blade from the glass at high wind velocities, and at the same time, provide a windshield wiper capable of flexing to follow a curved windshield.

Accordingly, it is a primary object of this invention to provide a windshield wiper having resilient means adapting it for operation with a curved windshield, and which remains in contact with the windshield even at high wind velocities.

It is an additional object of the invention to provide a windshield wiper assembly with a multi-tension biasing means for urging the wiper carrying arm toward the windshield.

It is another object of this invention to provide a windshield wiper with means for developing a resilient force in opposition to the lifting tendency of the wind which is greater than the resilient force normally biasing the windshield wiper toward the windshield.

It is still another object of this invention to provide a wiper arm including a mounting section and a wiper carrying section with resilient means coacting between the two sections having two differing rates of pressure development, one rate serving to hold a substantially constant wiping contact pressure on the windshield wiper blade, the other rate becoming effective in the movement of said wiper carrying arm section in a direction away from the windshield and causing a substantial increase in the pressure delivered to the blade whenever the arm is in a position more remote from the windshield.

It is a further object of this invention to provide a windshield wiper with means for shortening the resilient lever biasing the wiper arm toward the glass and thus providing a quick build-up, in spring pressure when the wiper is flexed away from the windshield by the wind.

Yet another object of this invention is to provide a windshield cleaner for curved windshields with simple and economical means for limiting the movement of the wiper arm in directions normal to the windshield without sacrificing the ability of the flexible arm to track the curved windshield.

These and other objects and advantages will become apparent as this description proceeds, reference being made therein to the accompanying drawings in which.

Figure 1:
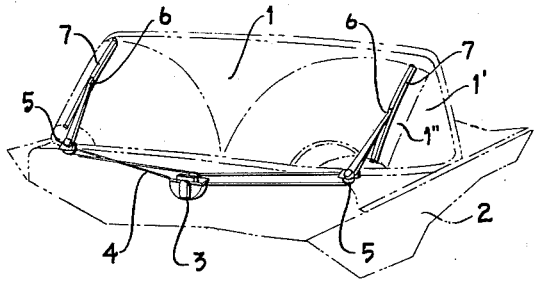
Fig. 1 is a perspective view of a "wrap-around" vehicle windshield with a pair of windshield cleaners made in accordance with the present invention.

Referring first to Fig. 1, it should be noted that the windshield cleaners there illustrated are in position at the points of greatest curvature of the windshield. This is the position, as has already been mentioned, in which the wind is most effective in lifting the wiper arm away from the windshield. The wrap-around windshield has a frontal area 1 of slight curvature joined to lateral areas 1' by a sharply curved crest area 1" and is mounted on a vehicle body 2. A wiper motor 3 is mounted below the hood of the vehicle and centrally of the windshield. A driving cable 4 connects the wiper motor to a pair of rockshafts or drive shafts 5 positioned below the windshield on opposite sides of the wiper motor. The wiper motor communicates oscillatory movement to the drive shafts by means of the driving cables. Secured to the drive shafts for movement therewith are actuating arms or wiper arm units 6. The wiper arm units carry at their ends the wiper blades 7.

Figure 2:
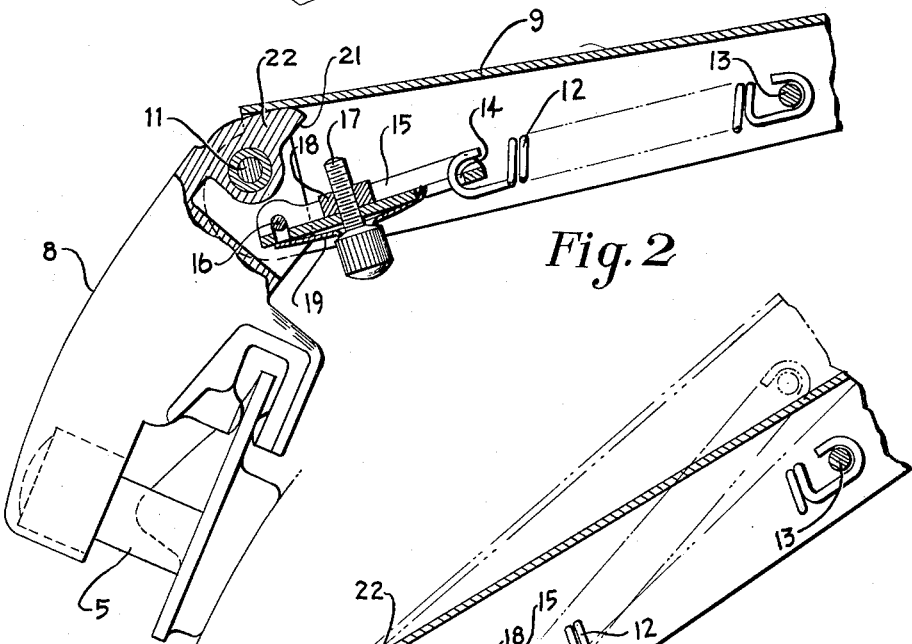
Fig. 2 is a fragmentary longitudinal sectional view of the wiper arm units of the present invention, with a detail showing of the biasing means.

Turning now to Fig. 2, the wiper arm unit 6 is actually a hinged structure having a mounting section 8 and a wiper-carrying section 9. The mounting section is fixed to the end of the drive shaft 5 and oscillates therewith. The mounting section shown in the drawings is of the blade normalizing type, but it is not disclosed in detail here since it forms no part of the present invention. A blade normalizing mounting section for windshield wipers, similar to that shown in outline here, will be found in Patent No. 2,781,540, dated February 19, 1957.

The wiper carrying section 9, which is a metal arm having an inverted U-shaped cross-section, is pivoted on a pin 11 which has a bearing in mounting section 8. Thus mounted, the wiper carrying section may pivot in directions normal to the windshield. The coil spring 12 is the resilient element provided for biasing the wiper carrying section 9 toward the windshield to perform its cleaning function. At one end the coil spring is hooked about an anchor pin 13 on wiper-carrying section 9, and at the other end the spring is pivotally connected at link anchorage or pivot 14 on a link or plate 15 which, in turn, is pivotally mounted on pin 16 provided in mounting section 8. The spring 12 and the link 15 together thus form an articulate resilient connection between the wiper carrying section and the mounting section. The link 15 accommodates an adjustment screw 17 which is threaded through the link. For fixing the setting of the screw a nut 18 is provided to bear against the internal surface of the link in opposition to the tension of a bowed spring 19 positioned between the external surface of the link and the head of the adjustment screw. The adjustment screw is so located on the link that movement of the link away from the windshield will bring the end of the screw into contact with the stop shoulder 21 provided on the journal bearing 22 (which is integral with mounting section 8). It is thus seen that the length of the arc described by the link in a direction away from the windshield will be determined by the extent to which the adjustment screw 17 is threaded through the link.

When a wiper of this type is installed on a vehicle, the arm is moved to the highest point on the crest of the curved windshield over which it is required to travel. At that point the adjustment screw 17 is threaded down until the end of the screw just touches stop shoulder 21. It will be seen that when the wiper assembly is adjusted in this fashion, the wiper carrying arm may freely flex toward the windshield on either side of the aforesaid high point or crest area under the urging of the coil spring 12. Cleaning pressure is thus constantly maintained by spring 12 over the whole arc swept by the wiper blades. During each stroke, as the wiper blade approaches the high point at the outer edge of the windshield, the end of the adjustment screw will approach the stop shoulder 21.

The operation of this wiper assembly under wind conditions tending to lift the wiper blade from the windshield will now be described. It has already been pointed out that at high driving speeds the force of the wind is most acute at the edge of the windshield, i.e., at the high point of windshield curvature. As the wiper blade approaches this high point on the return stroke (with the end of the adjustment screw 17 approaching contact with the stop shoulder), let it be assumed that the wind overcomes the tension of spring 12 momentarily, and pivots the wiper carrying arm away from the windshield about pin 11. Almost immediately the adjustment screw contacts the stop shoulder and the pivoting movement of the link is checked. The composite tension link 12, 15, which had previously controlled pivotal movement of the wiper carrying arm, is thus abruptly shortened to consist only of the spring 12. The line of spring force of the composite link extends through the pins 13 and 16, and its perpendicular distance from the pivotal axis affords a definite leverage which decreases as the composite link and the wiper carrying arm section 9 swing away from the glass surface. On the other hand, after the screw 17 engages the stop shoulder 21, further wind lifting movement of the arm will cause the spring alone to act as a substitute tension link as it pivots about its anchorage 14. To prevent this shortened tension link 12 from pivoting outwardly with the wiper carrying arm, a far greater counteracting force must be exerted on the wiper carrying arm by the wind stream and this is provided for by the arrangement of the link pivot 14 relative to the arm pivot 11 which gives a greater leverage over that obtained by the present location of the pivot 16. In fact, the initial wind lifting movement of the composite link decreases the counteracting effect of the spring, in contrast to the effect of the spring alone, on the wiper arm. By varying the spacing of the link anchorages 14 and 16 from each other and relative to the arm pivot 11 will cause variations in the force required to lift the wiper from the glass.

The composite link 12, 15, pivoting about anchor 16, and the tension link 12, pivoting about anchor 14, provide a multi-stage biasing means for the wiper carrying arm section, each stage operating independently of the other and having its own limited sphere of operation, and both having two differing rates of pressure development.

Figure 3:
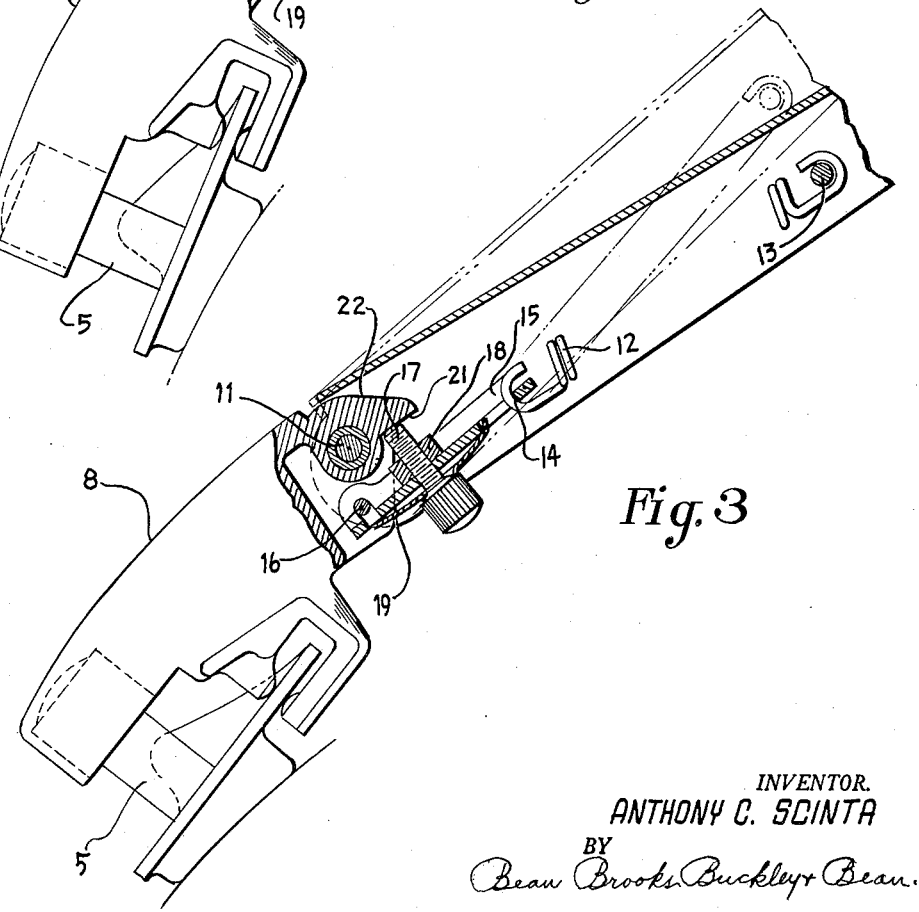
Fig. 3 is a view similar to Fig. 2 with the wiper arm unit shown in the position occupied at the highest point of curvature of the windshield.

The reason for this may be explained as follows: The anchor pin 13 describes a fixed arc about pin 11 in moving away from the windshield. If an arc is swung about pin 16 it will be seen that the distance between this arc and the arc described by pin 13 gradually increases with the distance from the windshield. In the present structure, the coil spring 12 must compensate for the distance between the arcs. Thus, as pin 13 moves on its arcuate course away from the windshield, the opposing spring tension gradually increases. When movement of the link 15 is halted by stop shoulder 21, the spring 12 will pivot 14 on link 15 and describe an arc about pivot 14 which falls rapidly away from the arc described by pin 13 as the distance from the windshield increases. Therefore, the spring must vary rapidly in length to accommodate the disparity between the arcs, which is to say that when the spring alone controls the movement of the wiper-carrying arm 9 there is a fast build-up of spring tension. In Fig. 3 there is a dotted line showing of wiper-carrying arm 9 pivoting under the control of the spring alone. The force required to pivot the wiper-carrying arm away from the glass is immediately increased the instant the screw 17 touches the stop shoulder 21. This contact occurs at the high point of windshield curvature, and therefore, a greater spring pressure becomes available at just the point where the wind lift forces are most likely to lift the wiper blade from the windshield.

Further, it should be pointed out that by means of the abutment 21 and its functioning with the adjustable screw 17 and the rapid buildup of holding pressure in positions above that where the adjustable stop becomes effective and, as indicated above, the arm and blade by this means are retained in close position to the windshield even though the lifting force of wind movements is sufficient to take the blade out of contact with the windshield surface, it should be pointed out here that under these worst of conditions the blade will be returned into its wiping contact with the windshield very much quicker because of this reinforcing effect. This is true partly because of the fact that the same augmented force which retards the lifting is effective to bring it down faster and quicker. This augmented retaining force prevents the blade from going out as far away from the windshield, and consequently the blade doesn't have to move as far in order to come back into wiping contact. Obviously, therefore, the results of this augmentation of pressure not only have the effect of keeping the blade in wiping contact longer and against more severe wind lifting tendencies, but also, in combination, the effect of getting the blade back into wiping position quicker and before so much arc of travel has been accomplished in the movements of the blade. The interference of the wind action with the wiping effect of the blade is therefore very substantially reduced, and in most cases completely eliminated.

It is noteworthy of the structure of this invention that while increased spring pressure is provided to meet the lifting force of the wind currents, the load on the wiper motor is not increased because a much lower spring pressure is provided for normal cleaning action. Further, a windshield wiper assembly has been provided which embodies multi-tension biasing means. Under the spring pressure of the biasing means the wiper blade will maintain wiping contact with a curved windshield with positive cleaning pressure under normal driving conditions. At high speed driving conditions, the wiper assembly will resist the tendency to lift away from the windshield with a spring pressure greater than that provided for cleaning purposes. Moreover, the assembly is readily adjustable to windshields of varied curvature.

The invention has been described in a preferred form, and may clearly be embodied in other specific forms which do not essentially depart from the spirit or scope thereof. It is intended to claim all such modifications of this invention.

What is claimed is:

1. A windshield wiper arm comprising a mounting section, a wiper carrying section pivotable thereon, and an automatically operable multi-stage tensioning means having a wiping-tension stage normally imposing a wiping pressure on the wiper carrying section, and a lift tension stage operable independently of a portion of the wiping tension stage to impose a pressure on said wiper carrying section which is greater than said wiping pressure when said wiper carrying section moves in a direction which is away from a windshield.

2. A windshield wiper arm comprising a mounting section, a wiper carrying section pivotable thereon, and automatically operable multi-stage tensioning means having a wiping-tension stage of one leverage for imposing a wiping pressure on the wiper carrying section, and a lift-tension stage of greater leverage for resisting the movement of said wiper carrying section away from a windshield by wind lifting currents.

3. A windshield wiper arm comprising a mounting section, a wiper carrying section pivotable thereon, and automatically operable multi-stage tensioning means having a wiping-tension stage and a lift-tension stage, the latter stage being separate and distinct from the former stage and exerting greater pressure on the wiper carrying section, said latter stage automatically becoming effective when said wiper carrying section tends to move away from a windshield.

4. In a windshield wiper assembly for use on a curved windshield, an oscillatory shaft, a wiper arm unit fixed thereon, said wiper arm unit including a mounting section and a wiper carrying section with resilient means co-acting between the said two sections having two differing rates of pressure development, one of said rates serving to hold a substantially constant amount of contact pressure between the windshield wiper blade and its coacting windshield surface when said wiper carrying section is relatively near the windshield, the other of said rates automatically becoming effective at a fairly definite point in the movement of said wiper carrying arm section in a direction away from the windshield and causing a substantial increase in the pressure delivered to the blade whenever the arm is in a position which is farther away from the windshield.

5. In a windshield wiper assembly for use on a curved windshield, an oscillatory shaft, a wiper arm unit fixed thereon, said wiper arm unit including a mounting section and a wiper-carrying section with resilient means reciprocally effective between the said two sections to provide a predetermined amount of contact pressure between the wiper of said wiper assembly and the windshield under normal conditions of operation, said pressure applying means including position controlled means automatically operable during wiper operation for sharply increasing the force exerted by said resilient means concurrent with superelevated positional changes relative to said windshield of said wiper-carrying section beyond the point of its normal functioning over the highest part of the windshield that is being wiped.

6. A windshield wiper for a curved windshield, comprising an oscillatory drive shaft, a wiper arm fixed thereon, a wiper blade on said arm, said wiper arm including a mounting section fixed to said drive shaft and a wiper carrying section pivotally connected to said mounting section, biasing means urging said wiper carrying section toward said windshield, said biasing means including a link member mounted for limited pivotal movement on said mounting means, a resilient member connecting said link member and said wiper carrying section, and means automatically operable during wiper operation for terminating pivotal movement of said link member when said wiper carrying section moves in a direction away from said windshield whereby said biasing means automatically tends to urge said wiper carrying section toward said windshield with a greater force than when said link is free to pivot to thereby oppose the tendency of said wiper blade from leaving the windshield.

7. A windshield cleaner for curved windshields, comprising an oscillatory drive shaft, a wiping arm unit on said drive shaft including a mounting section non-rotatably secured on the end of said shaft, a wiper carrying section pivotally supported on said mounting section, multi-tension biasing means including a resilient and a non-resilient member having an articulate connection, said non-resilient member being connected to said mounting section for limited pivotal movement, said resilient member having connection to said wiper carrying section, and means operatively associated with said non-resilient member for terminating its movement when said wiper carrying section reaches a given point in its movement away from a windshield.

8. In a windshield wiper assembly for use with curved windshields, an oscillatory shaft, a wiper arm unit fixed on said shaft, said wiper arm including a mounting section and a pivotally supported wiper carrying section on said mounting section, said mounting section having a stop shoulder thereon, multi-tension biasing means including a non-resilient member and a resilient member pivotally connected together, said non-resilient member having pivotal connection with said mounting section and said resilient member having pivotal connection with said wiper carrying section, and said non-resilient member having a stop element thereon for cooperation with said stop shoulder to limit pivotal movement of said non-resilient member, whereby a larger resilient biasing force tends to bias said carrying section toward a windshield if it continues movement away from a windshield after said stop element engages said stop shoulder than the force biasing said carrying section toward a windshield before said stop shoulder and stop element are in engagement.

9. In a windshield wiper assembly for a curved window surface, a rockshaft, an actuating arm supported by said rockshaft for oscillation thereby, said actuating arm having a first section non-rotatably secured to said rockshaft, said first section having a stop shoulder thereon, an arm-carrying section pivotally mounted on said first section for movement substantially normal to said window surface, automatically operable multi-tension biasing means for urging said arm-carrying section toward said window surface including a non-resilient portion having connection with a resiliently extensible portion, said non-resilient portion having pivotal connection with said first section, said resiliently extensible portion connected to said arm-carrying section, and an adjustable stop element on said non-resilient portion for cooperation with said stop shoulder to limit pivotal movement of said non-resilient portion.

10. A windshield cleaner for a vehicle having a curved windshield, comprising a rockshaft, a wiper arm unit on said rockshaft including a shaft-mounted section non-rotatably secured on the end of said shaft and an arm-mounting section pivoted on said shaft-mounted section for movement in planes substantially normal to said windshield, biasing means for yieldably urging said arm-mounting section toward said windshield, said biasing means including a rigid link member pivoted on said shaft-mounted section and an extensibly resilient member connecting said link member to said arm-mounting section, and means in said wiper arm unit for automatically effecting rapid build-up in resilient biasing force tending to maintain said wiper carrying section in wiping position when said arm-mounting section pivots beyond a predetermined angular position.

11. A windshield cleaner for a vehicle having a curved windshield, comprising an oscillating drive shaft, a wiper actuating arm supported by said shaft for oscillation therewith, said actuating arm having a mounting section fixed to said shaft and a wiper carrying section, said wiper carrying section having a pivotal connection to said mounting section to permit movement in planes substantially normal to said windshield, biasing means urging said wiper carrying section toward said windshield, said biasing means comprising a rigid link pivotally connected to said mounting section and a coil spring having a first connection at one end to said rigid link and a second connection at its other end to said wiper carrying section, and cooperating means on said link and said mounting section limiting pivotal movement of said link.

12. A windshield wiper for a curved windshield, comprising an oscillating drive shaft, a wiper arm unit secured to said shaft for oscillation therewith, a wiper blade on said wiper arm unit, said wiper arm unit including a mounting section non-rotatably fixed to said drive shaft and a wiper carrying section having pivoted connection with said mounting section, spring means pivotally connected at one end thereof to said wiper carrying section, link means connected to said mounting means for limited pivotal movement, and a pivotal connection between said link means and said spring means, said link and spring means cooperating to hold said wiper blade in contact with said windshield, and means for terminating pivotal movement of said link means when a given point is reached during the movement of said carrying section away from a windshield.

13. A windshield cleaner for a curved windshield, comprising a rockshaft, an actuating arm on said rockshaft including a mounting section fixed to the end of said rockshaft, a wiper carrying section pivotally supported on said mounting section for movement toward and away from said windshield, a stop shoulder on said mounting section, biasing means connecting said mounting section to said wiper carrying section for urging said wiper carrying section toward said windshield, said biasing means including a non-resilient member pivotally connected to said mounting section and a resilient member pivotally connected to each of said non-resilient member and wiper carrying section, said non-resilient and resilient members together constituting a primary link for exerting cleaning pressure during normal operation, a stop member on said non-resilient member cooperating with said stop shoulder for limiting pivotal movement of said non-resilient member under high-lift wind conditions, said resilient member alone constituting a shorter secondary link for fast build-up of pressure under said high-lift wind conditions.

14. In a windshield wiper for a curved windshield, an oscillating shaft, a wiper arm thereon including a mounting section non-rotatably mounted on said shaft and a wiper carrying section pivotally connected to said mounting section, means for urging said wiper carrying section toward said windshield, said means including a partially resilient primary link pivotally connected between said mounting section and said wiper carrying section for biasing said wiper carrying section toward said windshield under normal operating conditions, and including a shorter resilient secondary link pivoting at a point intermediate said mounting section pivot and the point of attachment for said partly resilient link to said wiper carrying section and capable of fast build-up of resilient pressure operative under high-lift wind conditions to bias said wiper carrying section toward said windshield.

15. A windshield cleaner for a curved windshield on a vehicle, comprising an oscillatory drive shaft, a shaft-mounted first section of a wiper arm unit non-rotatably secured to said shaft and having a stop shoulder thereon, a wiper carrying section having a pivotal connection with said first section, a primary link connecting said first and second sections for urging said second section toward said windshield under normal operating conditions, said primary link having connected resilient and non-resilient portions, said non-resilient portion having pivotal connections with said first section, and a shorter secondary link formed by said resilient portion connecting said second section and said non-resilient portion when said non-resilient portion contacts said stop shoulder, said secondary link providing rapid build-up in resilient force under high-lift wind conditions.

16. A windshield wiper assembly comprising a windshield wiper, a wiper arm for mounting said wiper, said wiper arm including a wiper carrying section, and automatically operable biasing means operatively associated with said wiper carrying section for exerting a first resilient force tending to maintain said wiper blade in wiping contact with a windshield in the absence of forces tending to pull said wiper carrying arm away from said windshield and for exerting a second resilient force on said wiper carrying section in the direction of said windshield when said section moves beyond a given point in a direction away from a windshield, said second force being of a greater magntude than said first force whereby movement of said wiper carrying section away from said windshield is resisted by a greater force than which is normally utilized for maintaining a wiper blade in normal wiping relationship with a windshield.

References Cited in the file of this patent

UNITED STATES PATENTS

| | | |
|---|---|---|
| 2,715,729 | Anderson | Aug. 16, 1955 |
| 2,736,053 | Oishei et al. | Feb. 28, 1956 |

FOREIGN PATENTS

| | | |
|---|---|---|
| 514,158 | Great Britain | Nov. 1, 1939 |